(12) United States Patent
Lo et al.

(10) Patent No.: US 10,659,864 B2
(45) Date of Patent: May 19, 2020

(54) EARBUD CHARGING STORAGE CASE

(71) Applicant: CHENG UEI PRECISION INDUSTRY CO., LTD., New Taipei (TW)

(72) Inventors: Sheng Chieh Lo, New Taipei (TW); Peng Yuan Lee, New Taipei (TW); Hong Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/242,575

(22) Filed: Jan. 8, 2019

(65) Prior Publication Data
US 2020/0084532 A1 Mar. 12, 2020

(30) Foreign Application Priority Data
Sep. 7, 2018 (TW) .............................. 107212255 U

(51) Int. Cl.
*H04R 1/10* (2006.01)
*H02J 7/00* (2006.01)

(52) U.S. Cl.
CPC .......... *H04R 1/1025* (2013.01); *H02J 7/0044* (2013.01); *H02J 7/0047* (2013.01); *H04R 1/1016* (2013.01); *H02J 7/00* (2013.01); *H04R 2420/07* (2013.01)

(58) Field of Classification Search
CPC ............... H04R 1/1025; H04R 1/1016; H04R 2420/07; H02J 7/0044; H02J 7/0047; H02J 7/00
See application file for complete search history.

(56) References Cited

U.S. PATENT DOCUMENTS

| | | | | |
|---|---|---|---|---|
| 8,185,084 B2* | 5/2012 | Terlizzi | .................... | B21C 23/18 |
| | | | | 455/343.5 |
| 8,867,758 B2* | 10/2014 | Terlizzi | .............. | H01R 13/2428 |
| | | | | 381/74 |
| 9,949,015 B1* | 4/2018 | Minoo | .................. | H04R 1/1041 |
| 10,129,626 B1* | 11/2018 | Jung | ..................... | H04R 1/1016 |
| 2016/0073189 A1* | 3/2016 | Linden | ................. | H04R 1/1025 |
| | | | | 381/74 |
| 2017/0093079 A1* | 3/2017 | Wagman | .............. | H01R 13/521 |
| 2019/0327550 A1* | 10/2019 | Linden | ................... | H04R 11/02 |

* cited by examiner

*Primary Examiner* — David L Ton
(74) *Attorney, Agent, or Firm* — WPAT, PC

(57) ABSTRACT

An earbud charging storage case for storing and charging a pair of earbuds, includes an earbud holder, and a magnetic component bracket looped around the earbud holder. Each earbud has a magnetic element. The earbud holder has a base portion. Two sides of a bottom surface of the base portion protrude downward to form two accommodating portions. Two sides of a top surface of the base portion are recessed downward to form two lower receiving grooves. The two accommodating portions have two accommodating grooves. The two lower receiving grooves and the two accommodating grooves together define two storing grooves. The pair of the earbuds are accommodated in the two storing grooves. Several portions of a bottom surface of the magnetic component bracket are recessed upward to form a plurality of buckling grooves. Each of the plurality of the buckling grooves is equipped with a first magnetic component.

19 Claims, 15 Drawing Sheets

EARBUD CHARGING STORAGE CASE

BACKGROUND OF THE INVENTION

1. Field of the Invention

The present invention generally relates to an earbud charging storage case, and more particularly to an earbud charging storage case of which first charging connectors fully contact with earbud charging connectors of a pair of earbuds accommodated in the earbud charging storage case.

2. The Related Art

As is known to all, a conventional earbud charging storage case is used for storing and charging an earbud matched with the conventional earbud charging storage case. The conventional earbud charging storage case has an accommodating groove for accommodating the earbud. A bottom wall of the accommodating groove is equipped with a first charging connector. A bottom of the earbud also has a second charging connector. When the earbud needs charging, the earbud is accommodated in the earbud charging storage case, and the second charging connector of the earbud is in contact with the first charging connector in the earbud charging storage case for charging the earbud.

However, when the second charging connector of the earbud is in contact with the first charging connector in the earbud charging storage case, the first charging connector of the earbud charging storage case will produce an upward resilience, so the first charging connector of the earbud charging storage case has no way of fully contacting with the second charging connector of the earbud.

Therefore, it is necessary to provide a new-typed earbud charging storage case, so that first charging connectors of the new-typed earbud charging storage case fully contact with earbud charging connectors of a pair of earbuds accommodated in the earbud charging storage case.

SUMMARY OF THE INVENTION

An object of the present invention is to provide an earbud charging storage case for storing and charging a pair of earbuds. The earbud charging storage case includes an earbud holder and a magnetic component bracket. Each earbud has a magnetic element. The earbud holder has a base portion. Two sides of a bottom surface of the base portion protrude downward to form two hollow accommodating portions. Two sides of a top surface of the base portion are recessed downward to form two lower receiving grooves, respectively. Insides of the two accommodating portions have two accommodating grooves penetrating upward through top surfaces of the two accommodating portions, respectively. Tops of the two accommodating grooves are connected and communicated with the two lower receiving grooves, respectively. The two lower receiving grooves and the two accommodating grooves together define two storing grooves, respectively. The pair of the earbuds are accommodated in the two storing grooves, respectively. Bottom walls of the two accommodating grooves open two charging holes for facilitating charging the pair of the earbuds. The magnetic component bracket is looped around the earbud holder. The magnetic component bracket opens two holding grooves corresponding to the two accommodating portions, respectively. The two accommodating portions pass downward through the two holding grooves. Several portions of a bottom surface of the magnetic component bracket are recessed upward to form a plurality of buckling grooves. Each of the plurality of the buckling grooves is equipped with a first magnetic component. A first magnetic north pole and a first magnetic south pole of the first magnetic component are transversely arranged. When each earbud stores in the earbud charging storage case, the magnetic element of each earbud is located between two of the first magnetic components of the magnetic component bracket, a height difference between top surfaces of the first magnetic components and top surfaces of the two magnetic elements is generated. The height difference between the top surfaces of the first magnetic components and the top surfaces of the two magnetic elements of the pair of the earbuds improve a mutual attraction characteristic of the first magnetic north poles and the first magnetic south poles of the first magnetic components, and the second magnetic north poles and the second magnetic south poles of the two magnetic elements of the pair of the earbuds, so a downward magnetic attraction force is generated among the two magnetic elements of the pair of the earbuds and the first magnetic components.

Another object of the present invention is to provide an earbud charging storage case for storing and charging at least one earbud which has at least one magnetic element. The earbud charging storage case includes an outer shell, an earbud holder, a magnetic component bracket, and an upper cover mounted on the outer shell. The earbud holder is received in the outer shell. The earbud holder has a base portion. At least one portion of a bottom surface of the base portion protrudes downward to form at least one hollow accommodating portion. At least one portion of a top surface of the base portion is recessed downward to form at least one lower receiving groove. An inside of the at least one accommodating portion has at least one accommodating groove penetrating upward through a top surface of the at least one accommodating portion. A top of the at least one accommodating groove is connected and communicated with the at least one lower receiving groove. The at least one lower receiving groove and the at least one accommodating groove together define at least one storing groove. The at least one earbud is accommodated in the at least one storing groove. The magnetic component bracket is positioned around the at least one accommodating portion. The magnetic component bracket has at least one first magnetic component magnetically attracting the at least one magnetic element of the at least one earbud. A height difference between a top surface of the at least one first magnetic component and a top surface of the at least one magnetic element is generated, so a downward magnetic attraction force is generated between the at least one magnetic element of the at least one earbud and the at least one first magnetic component.

Another object of the present invention is to provide an earbud charging storage case for storing and charging at least one earbud. The earbud charging storage case includes an outer shell having at least one plane side wall, an earbud holder received in the outer shell for accommodating the at least one earbud, a locating bracket positioned between the earbud holder and the plane side wall, a battery positioned between the locating bracket and the earbud holder, a rigid printed circuit board received in the outer shell, and an upper cover mounted on the outer shell.

As described above, the downward magnetic attraction force generated by each of the first magnetic components is exerted on corresponding one of the two magnetic elements by virtue of an up-down misaligned disposition way of each of the first magnetic components and the corresponding one of the two magnetic elements, so that two earbud charging connectors can resist against resilience forces generated by two first charging connectors of the earbud charging storage case to fully contact with the two first charging connectors of the earbud charging storage case to achieve a charging effect.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
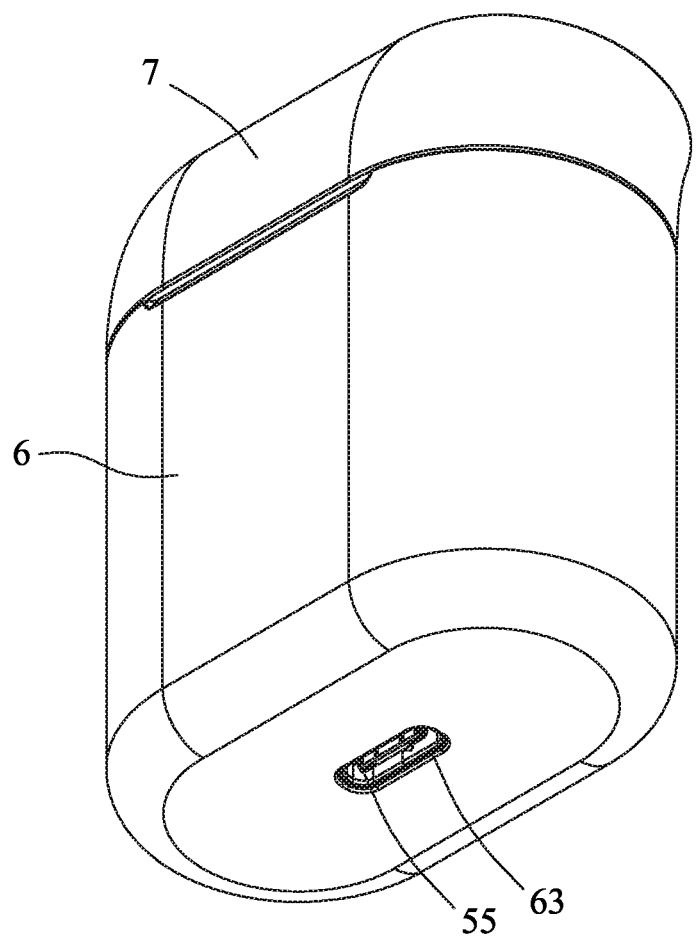
FIG. 1 is a perspective view of an earbud charging storage case in accordance with the present invention.
Figure 2:
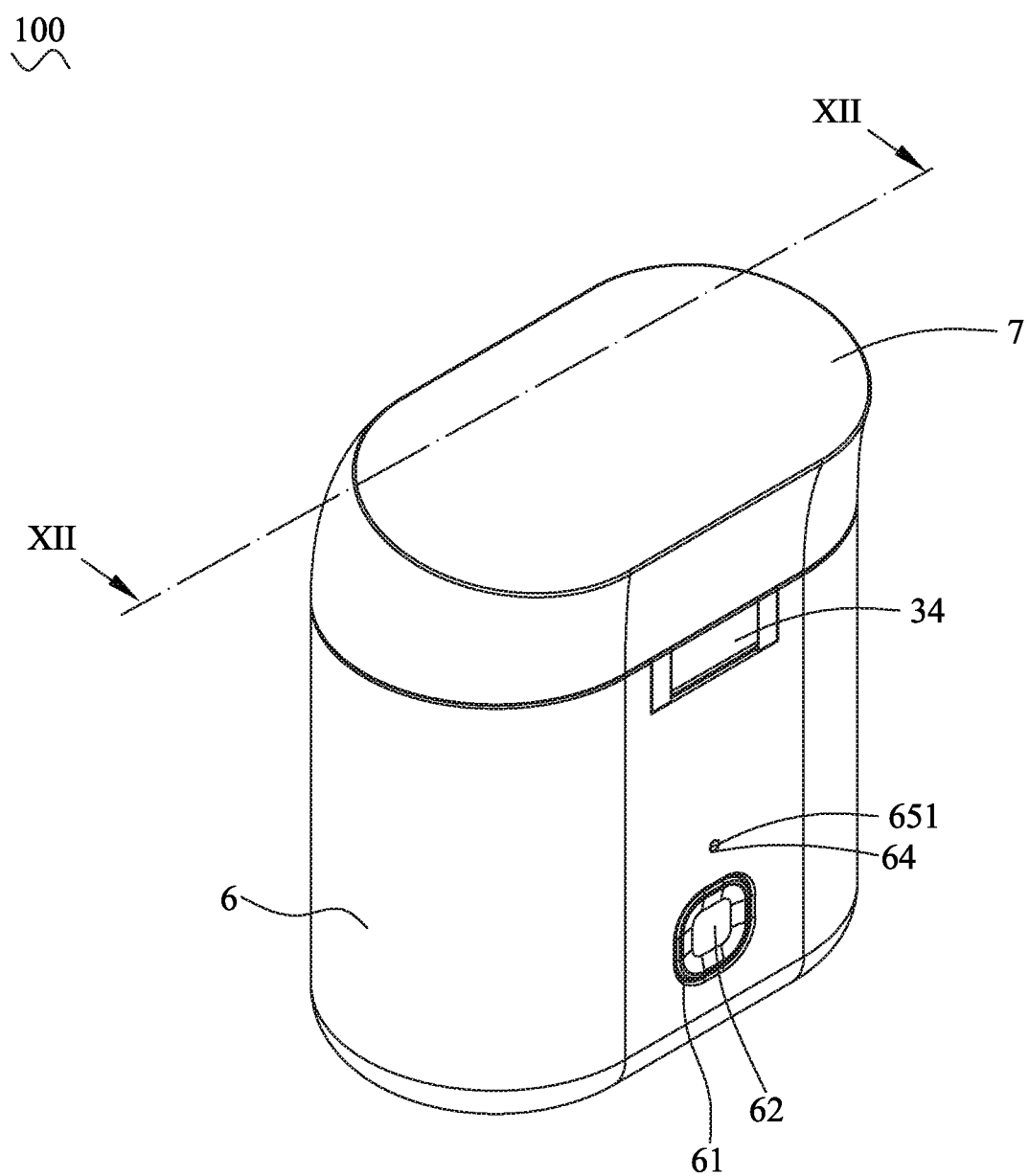
FIG. 2 is another perspective view of the earbud charging storage case of FIG. 1.

With reference to FIG. 1, FIG. 2, FIG. 3, FIG. 4, FIG. 13 and FIG. 14, an earbud charging storage case 100 in accordance with the present invention is shown. The earbud charging storage case 100 is used for storing and charging at least one earbud 200 which has at least one magnetic element 821. The earbud charging storage case 100 is used for storing and charging a pair of earbuds 200, and the earbud charging storage case 100 includes an earbud holder 1, a magnetic component bracket 2, a locating bracket 3, a battery 4, a rigid printed circuit board 5, an outer shell 6 and an upper cover 7. Each earbud 200 has a main part 81, and a hand shank 82 extended downward from a front of the main part 81. Each earbud 200 has a magnetic element 821 assembled in the hand shank 82.

With reference to FIG. 3 to FIG. 7, the earbud holder 1 has an elliptical base portion 101 seen from a top view. At least one portion of a bottom surface of the base portion 101 protrudes downward to form at least one hollow accommodating portion 11. At least one portion of a top surface of the base portion 101 is recessed downward to form at least one lower receiving groove 111. An inside of the at least one accommodating portion 11 has at least one accommodating groove 112 penetrating upward through a top surface of the at least one accommodating portion 112. A top of the at least one accommodating groove 112 is connected and communicated with the at least one lower receiving groove 111. Two sides of the bottom surface of the base portion 101 protrude downward to form two hollow accommodating portions 11. The earbud holder 1 defines two storing grooves 102. Two sides of the top surface of the base portion 101 are recessed downward to form two lower receiving grooves 111, respectively. Insides of the two accommodating portions 11 have two accommodating grooves 112 penetrating upward through the top surfaces of the two accommodating portions 11, respectively. The tops of the two accommodating grooves 112 are connected and communicated with the two lower receiving grooves 111, respectively. The two lower receiving grooves 111 are corresponding to the two main parts 81 of the pair of the earbuds 200. The two accommodating grooves 112 are corresponding to the two hand shanks 82 of the pair of the earbuds 200. The at least one lower receiving groove 111 and the at least one accommodating groove 112 together define at least one storing groove 102. The at least one earbud 200 is accommodated in the at least one storing groove 102. The two lower receiving grooves 111 and the two accommodating grooves 112 together define the two storing grooves 102, respectively. The pair of the earbuds 200 are accommodated in the two storing grooves 102 of the earbud charging storage case 100. The two main parts 81 of the pair of the earbuds 200 are received in the two lower receiving grooves 111. The two hand shanks 82 of the pair of the earbuds 200 are accommodated in the two accommodating grooves 112.

Bottom walls of the two accommodating grooves 112 open two charging holes 113 for facilitating charging the pair of the earbuds 200. Rears of the two accommodating portions 11 open two connecting holes 114, respectively. A rear surface of the base portion 101 is recessed frontward to form a notch 12. Two side walls of the notch 12 protrude towards each other to form two limiting blocks 121. Two sides of a bottom surface of the base portion 101 protrude downward to form two extending boards 13. The two extending boards 13 open two fastening holes 131. The two sides of the bottom surface of the base portion 101 are equipped with two magnetic parts 14 adjacent to two opposite sides of the two accommodating portions 11, respectively.

With reference to FIG. 3, FIG. 4, FIG. 5, FIG. 12 and FIG. 15, the magnetic component bracket 2 is looped around the earbud holder 1. The magnetic component bracket 2 is positioned around the at least one accommodating portion 11. The magnetic component bracket 2 has at least one first magnetic component 221 magnetically attracting the at least one magnetic element 821 of the at least one earbud 200. The magnetic component bracket 2 has at least two first magnetic components 221. The magnetic component bracket 2 has at least one holding groove 21 corresponding to the at least one accommodating portion 11. The at least one accommodating portion 11 passes downward through the at least one holding groove 21. The magnetic component bracket 2 opens two holding grooves 21 corresponding to the two accommodating portions 11, respectively. The two accommodating portions 11 pass downward through the two holding grooves 21, so that the magnetic component bracket 2 is looped around the earbud holder 1. At least two portions of a bottom surface of the magnetic component bracket 2 are recessed upward to form at least two buckling grooves 22 for receiving the at least two first magnetic components 221 respectively. Several portions of the bottom surface of the magnetic component bracket 2 are recessed upward to form a plurality of buckling grooves 22. The plurality of the buckling grooves 22 are isolated by the two holding grooves 21 and spaced from one another. Each of the plurality of the buckling grooves 22 is equipped with a first magnetic component 221. A first magnetic north pole N1 and a first magnetic south pole S1 of each first magnetic component 221 are transversely arranged. The first magnetic north pole N1 and the first magnetic south pole S1 of each first magnetic component 221 are opposite to each other along a front-to-rear direction or a right-to-left direction.

With reference to FIG. 3, FIG. 4, FIG. 5, FIG. 6, FIG. 12 and FIG. 14, the locating bracket 3 is mounted to a rear of the earbud holder 1. A front of the locating bracket 3 is recessed rearward to form a locating space 31. Two sides of an upper portion of the front of the locating bracket 3 protrude frontward to form two first pillars 32. The two first pillars 32 open two first fixing holes 321 penetrating through front surfaces of the two first pillars 32, respectively. The two first fixing holes 321 are corresponding to and communicated with the two fastening holes 131 of the earbud holder 1.

The earbud charging storage case 100 further includes two first fixing components 91, at least one second fixing component 92, a third fixing component 93 and a fastening unit 34. When the locating bracket 3 is assembled to the earbud holder 1, the two first fixing components 91 pass through the two fastening holes 131 of the earbud holder 1 and the two first fixing holes 321 of the locating bracket 3, so that the locating bracket 3 is fastened to the earbud holder 1. A rear surface of the locating bracket 3 protrudes rearward to form a convex board 33. The convex board 33 opens at least one second fixing hole 331 longitudinally penetrating through the locating bracket 3. Two sides of a rear end of a top of the locating bracket 3 protrude upward to form two protruding blocks 332 connecting with two sides of a top of an outer surface of the convex board 33. Two portions of the convex board 33 protrude outward to form two protruding blocks 332 arranged transversely. The fastening unit 34 is disposed between the two protruding blocks 332. Top surfaces of two sides of the fastening unit 34 abut against bottom surfaces of the two limiting blocks 121. A middle of the rear surface of the locating bracket 3 protrudes rearward to form an inverted U-shaped blocking frame 35 located under the convex board 33. An inside of the blocking frame 35 has a limiting groove 351.

Figure 6:
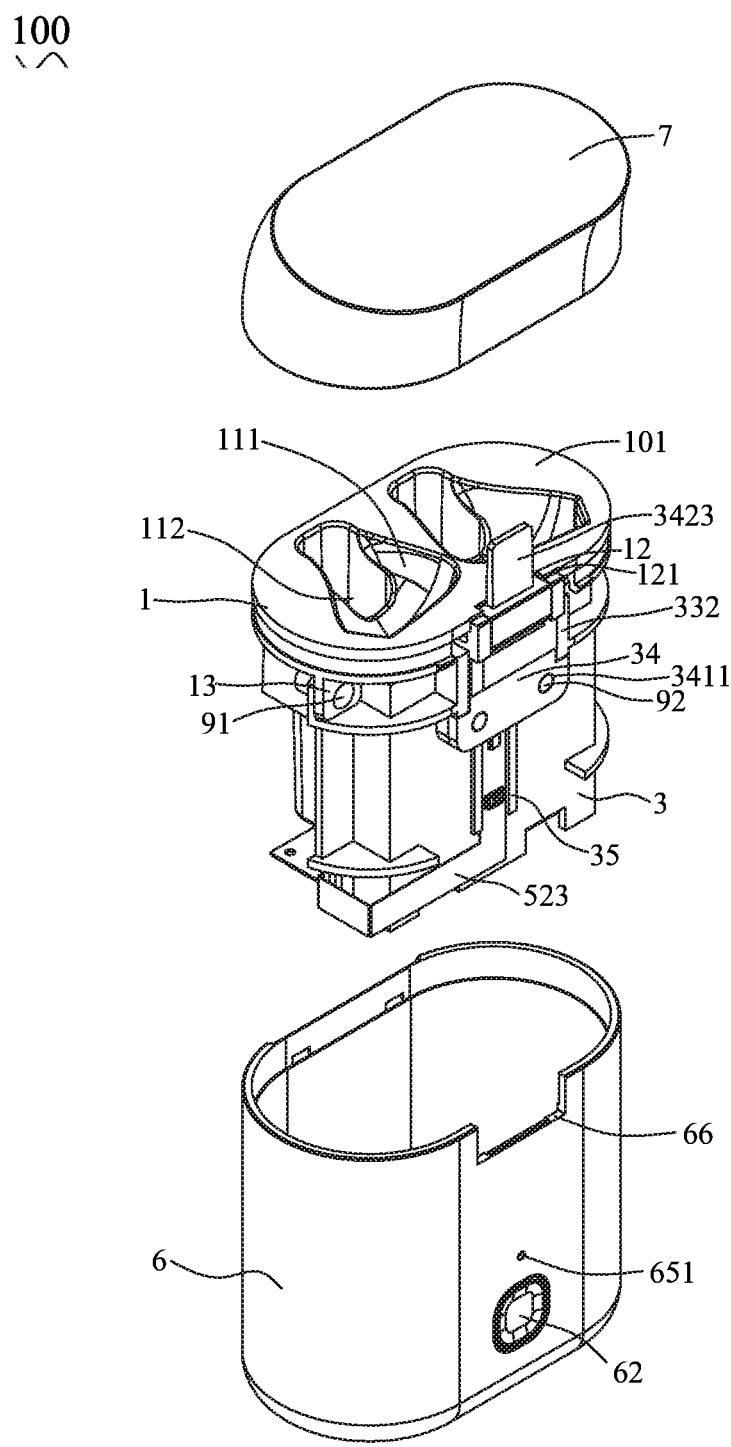
FIG. 6 is another partially exploded perspective view of the earbud charging storage case of FIG. 5.
Figure 7:
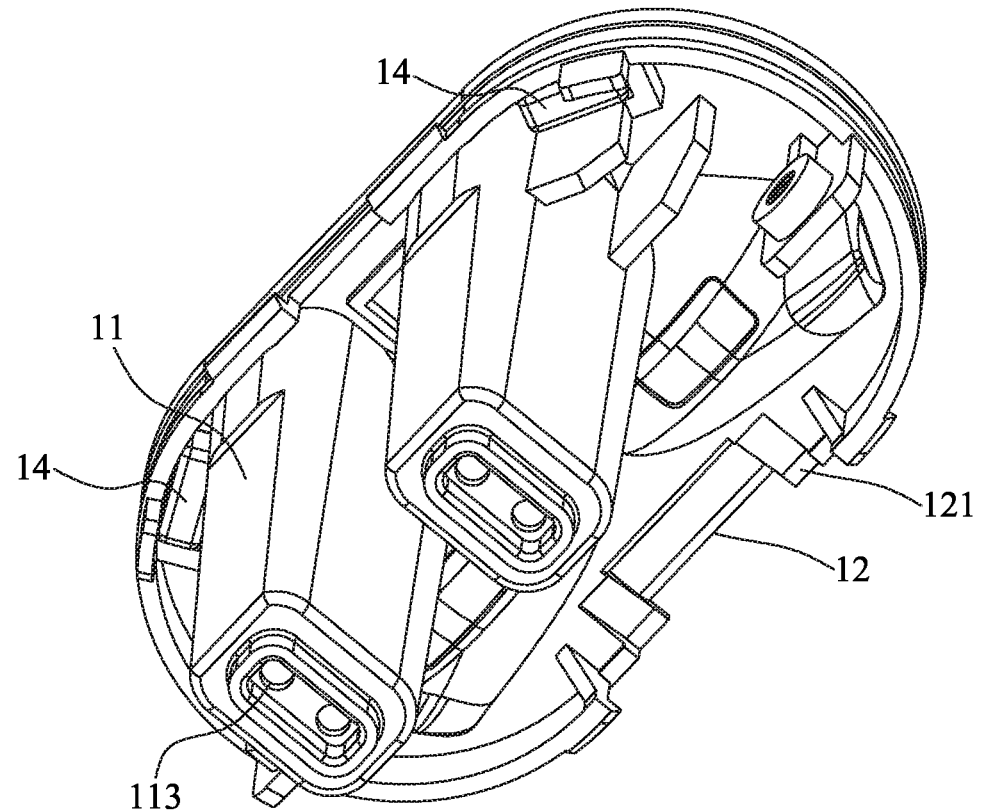
FIG. 7 is a perspective view of an earbud holder of the earbud charging storage case in accordance with the present invention.
Figure 8:
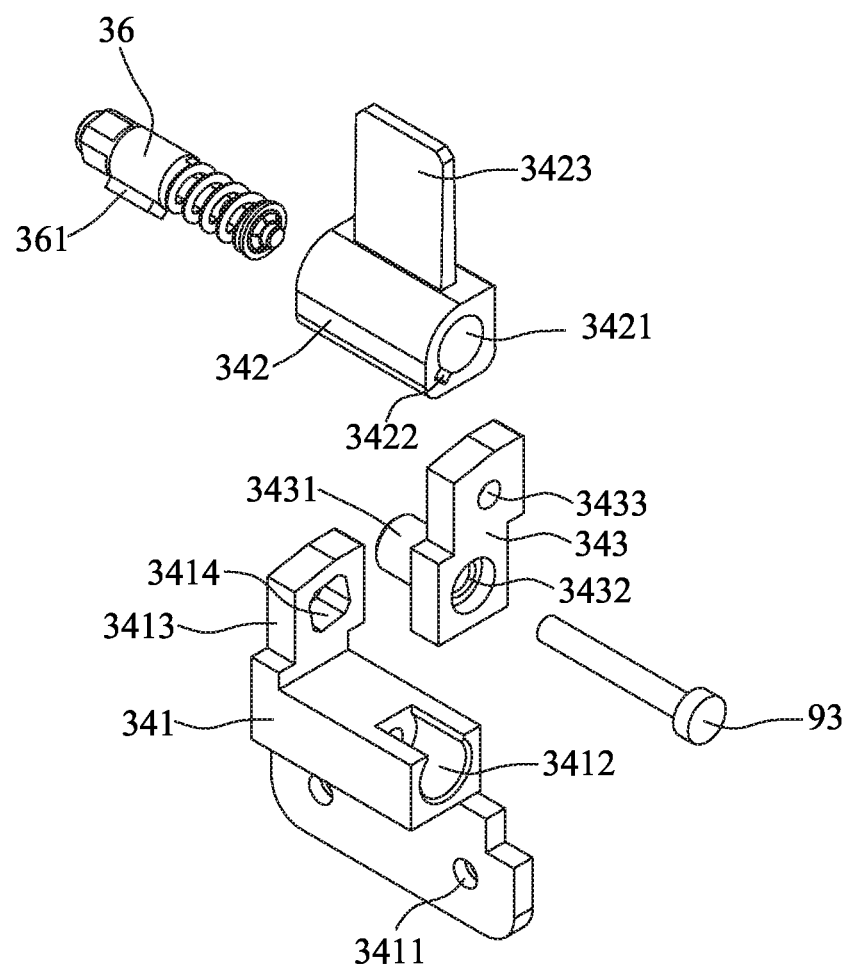
FIG. 8 is an exploded perspective view showing a clamping component of the earbud charging storage case in accordance with the present invention.
Figure 9:
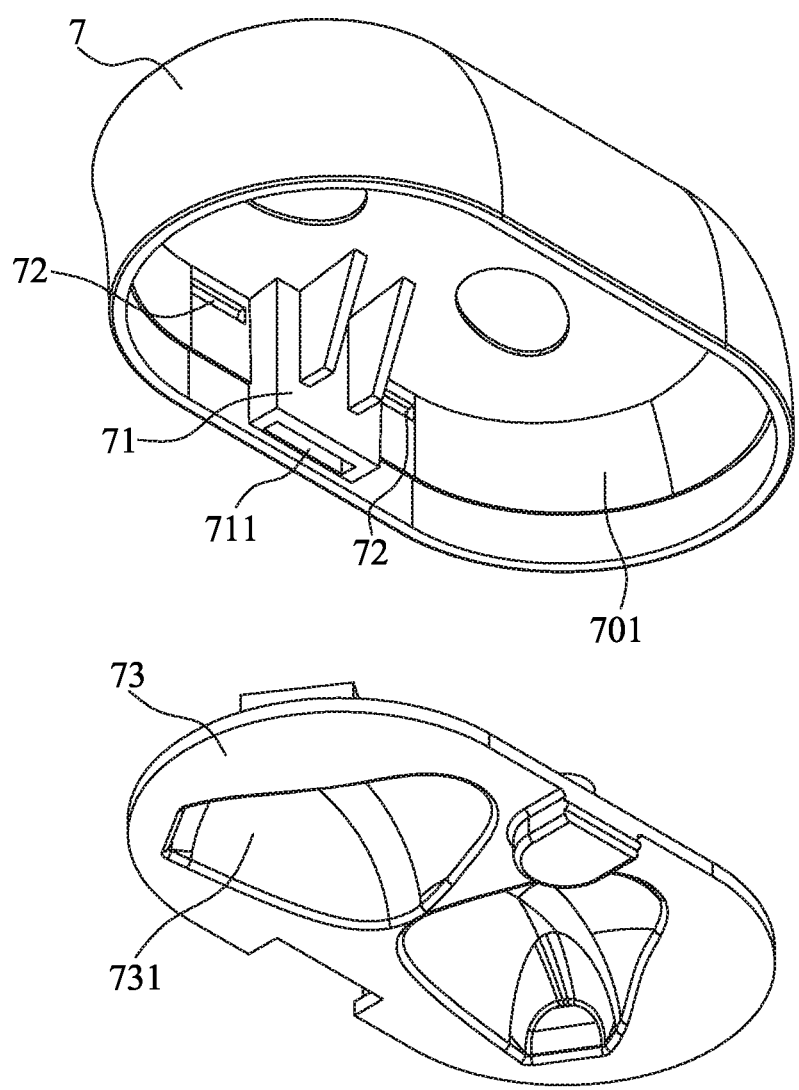
FIG. 9 is an exploded perspective view showing an upper cover of the earbud charging storage case in accordance with the present invention.
Figure 10:
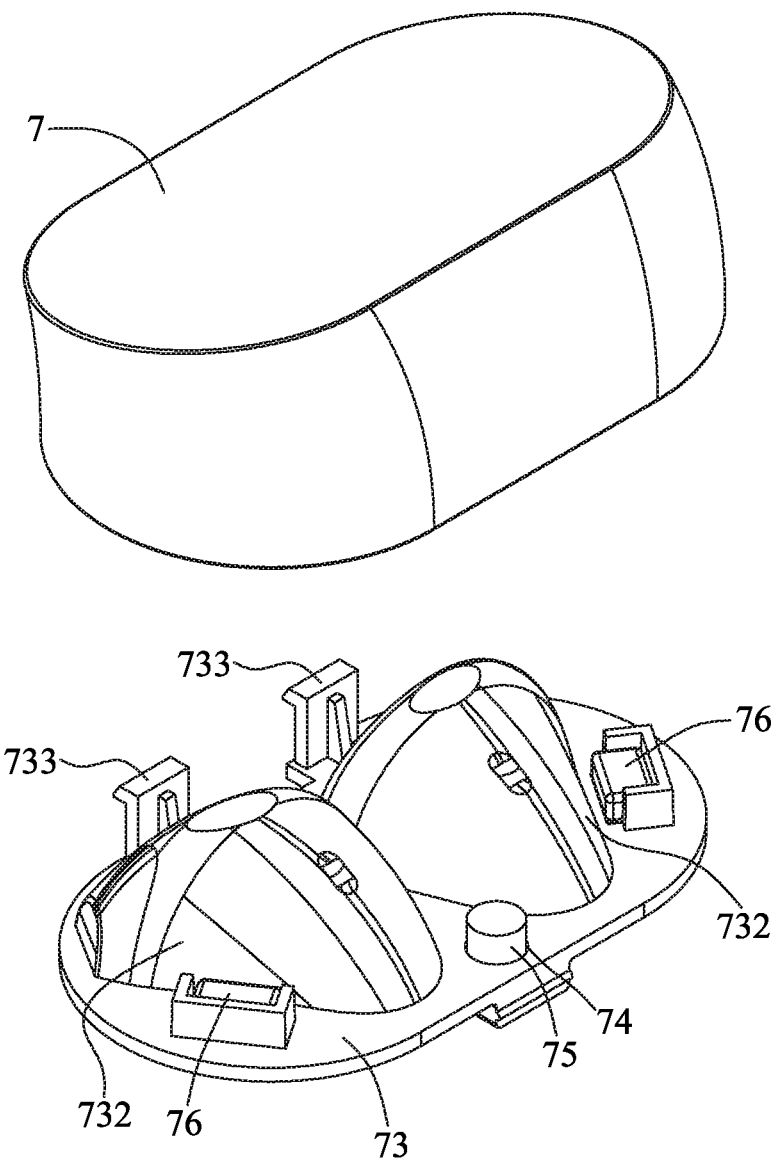
FIG. 10 is another exploded perspective view showing the upper cover of the earbud charging storage case of FIG. 9.
Figure 11:
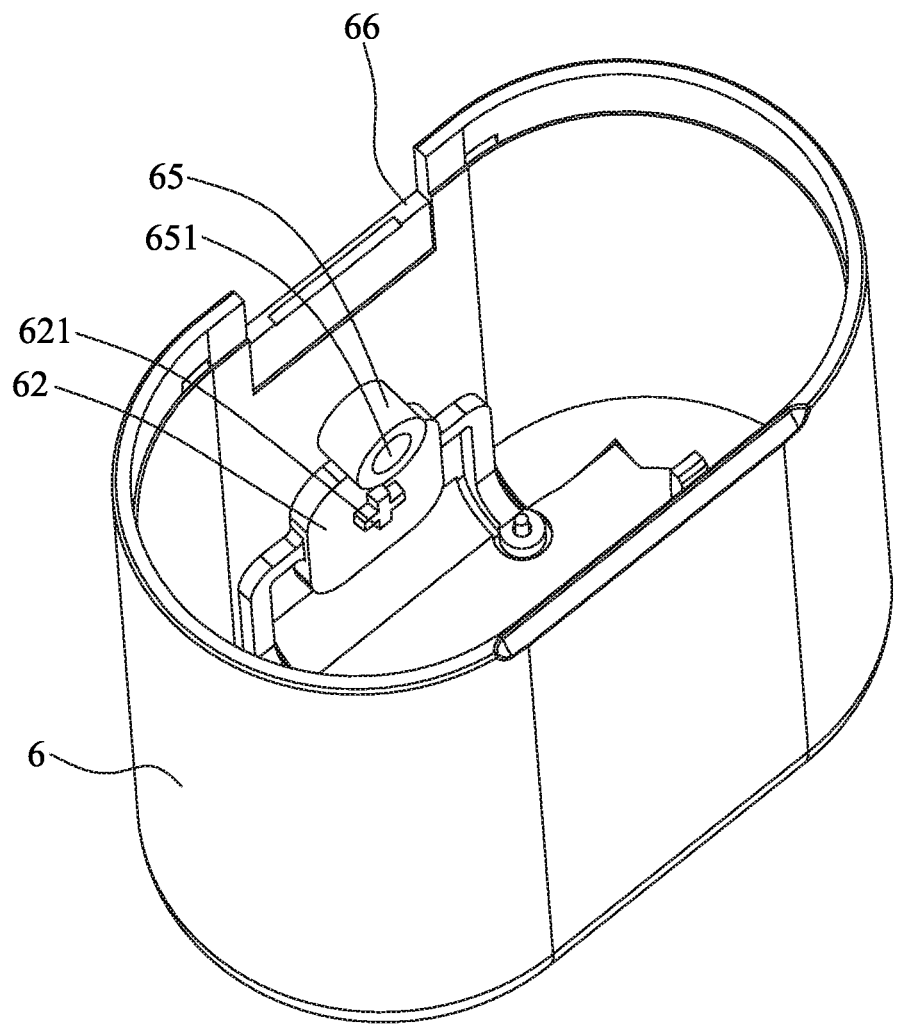
FIG. 11 is a perspective view showing an outer shell of the earbud charging storage case in accordance with the present invention.
Figure 12:
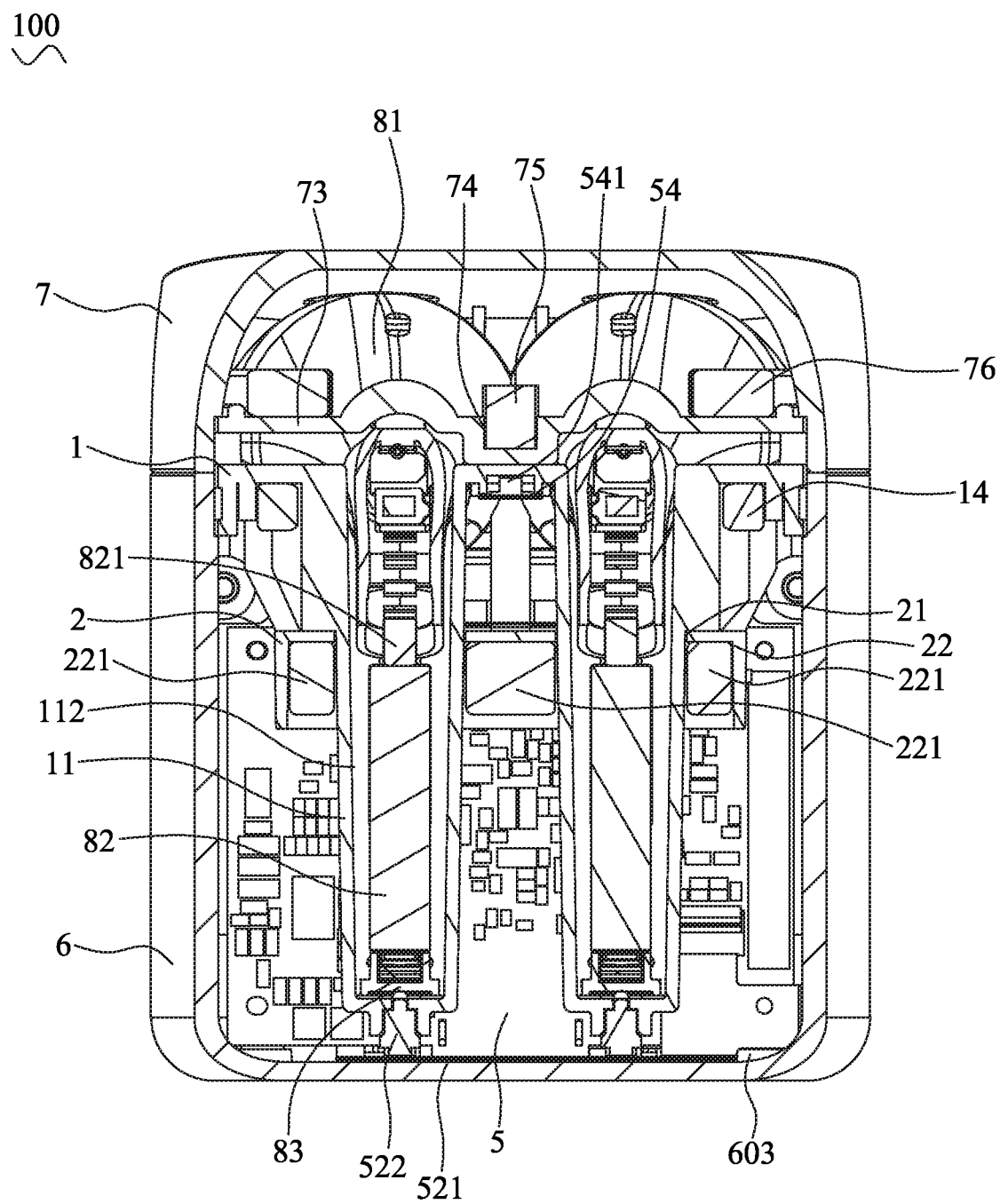
FIG. 12 is a partial cross-section view of the earbud charging storage case along a line XII-XII of FIG. 2.
Figure 13:
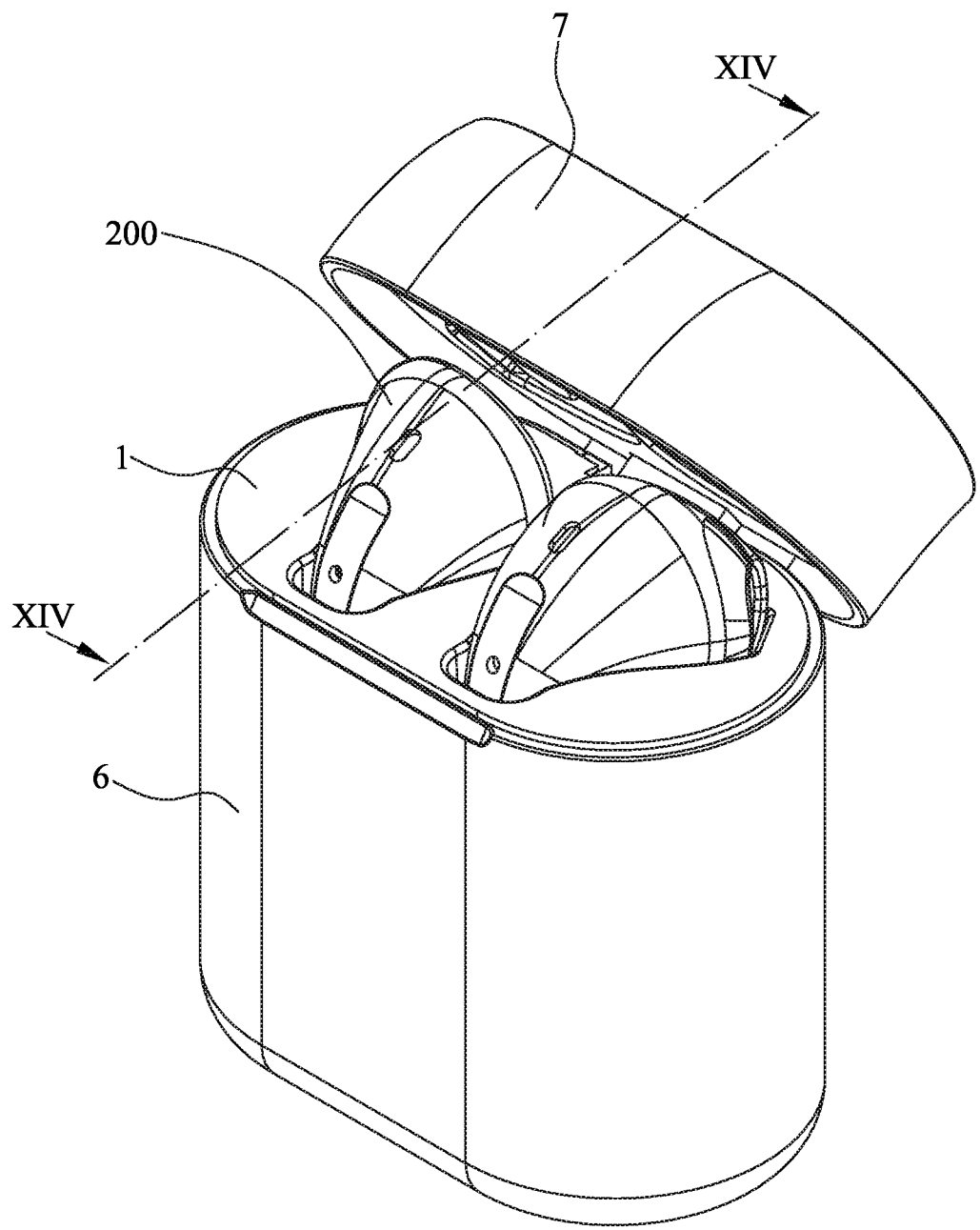
FIG. 13 is a perspective view showing that a pair of earbuds are accommodated in the earbud charging storage case in accordance with the present invention.

With reference to FIG. 6 to FIG. 8, the fastening unit 34 includes a first fastening block 341, a second fastening block 342 and a third fastening block 343. The first fastening block 341 has at least one third fixing hole 3411 longitudinally penetrating through the first fastening block 341. The at least one third fixing hole 3411 is corresponding to and communicated with the at least one second fixing hole 331. When the fastening unit 34 is assembled to the locating bracket 3, the at least one second fixing component 92 passes through the at least one second fixing hole 331 and the at least one third fixing hole 3411, so that the first fastening block 341 is fastened to the convex board 33. The first fastening block 341 opens a fourth fixing hole 3412 transversely penetrating through the first fastening block 341 of the fastening unit 34. A top of the first fastening block 341 protrudes upward to form a blocking block 3413. The blocking block 3413 opens a fifth fixing hole 3414.

The second fastening block 342 is mounted on the top of the first fastening block 341. The second fastening block 342 opens a sixth fixing hole 3421 transversely penetrating through the second fastening block 342. The sixth fixing hole 3421 is corresponding to the fifth fixing hole 3414 of the first fastening block 341. One side of the sixth fixing hole 3421 extends outward into an inner side wall of the sixth fixing hole 3421 to form an embedding slot 3422. A top of the second fastening block 342 protrudes upward to form a fastening portion 3423. The fastening portion 3423 is disposed in the notch 12 and projects beyond a top wall of the notch 12.

The third fastening block 343 is mounted on one side of the first fastening block 341 and the second fastening block 342. The second fastening block 342 is located between the first fastening block 341 and the third fastening block 343. A lower portion of one side surface of the third fastening block 343 protrudes perpendicular to the one side surface of the third fastening block 343 to form an insertion cylinder 3431. The insertion cylinder 3431 opens a seventh fixing hole 3432 transversely penetrating through the third fastening block 343 and the insertion cylinder 3431. The seventh fixing hole 3432 is corresponding to the fourth fixing hole 3412. When the third fastening block 343 is assembled to the first fastening block 341, the third fixing component 93 passes through the seventh fixing hole 3432 and the fourth fixing hole 3412, so that the third fastening block 343 is fastened to the first fastening block 341. A top of the third fastening block 343 opens an eighth fixing hole 3433 transversely penetrating through the third fastening block 343. The eighth fixing hole 3433 is corresponding to the sixth fixing hole 3421 of the second fastening block 342. The fastening unit 34 further includes a rotation shaft 36. An outer surface of the rotation shaft 36 protrudes outward to form an embedding block 361 projecting beyond the outer surface of the rotation shaft 36. When the third fastening block 343 is assembled to the first fastening block 341 and the second fastening block 342, the rotation shaft 36 passes through the fifth fixing hole 3414 of the first fastening block 341, the sixth fixing hole 3421 of the second fastening block 342 and the eighth fixing hole 3433 of the third fastening block 343, so that the first fastening block 341, the second fastening block 342 and the third fastening block 343 are fastened with one another. The embedding block 361 is assembled in the embedding slot 3422. The second fastening block 342 pivots around the rotation shaft 36.

Figure 3:
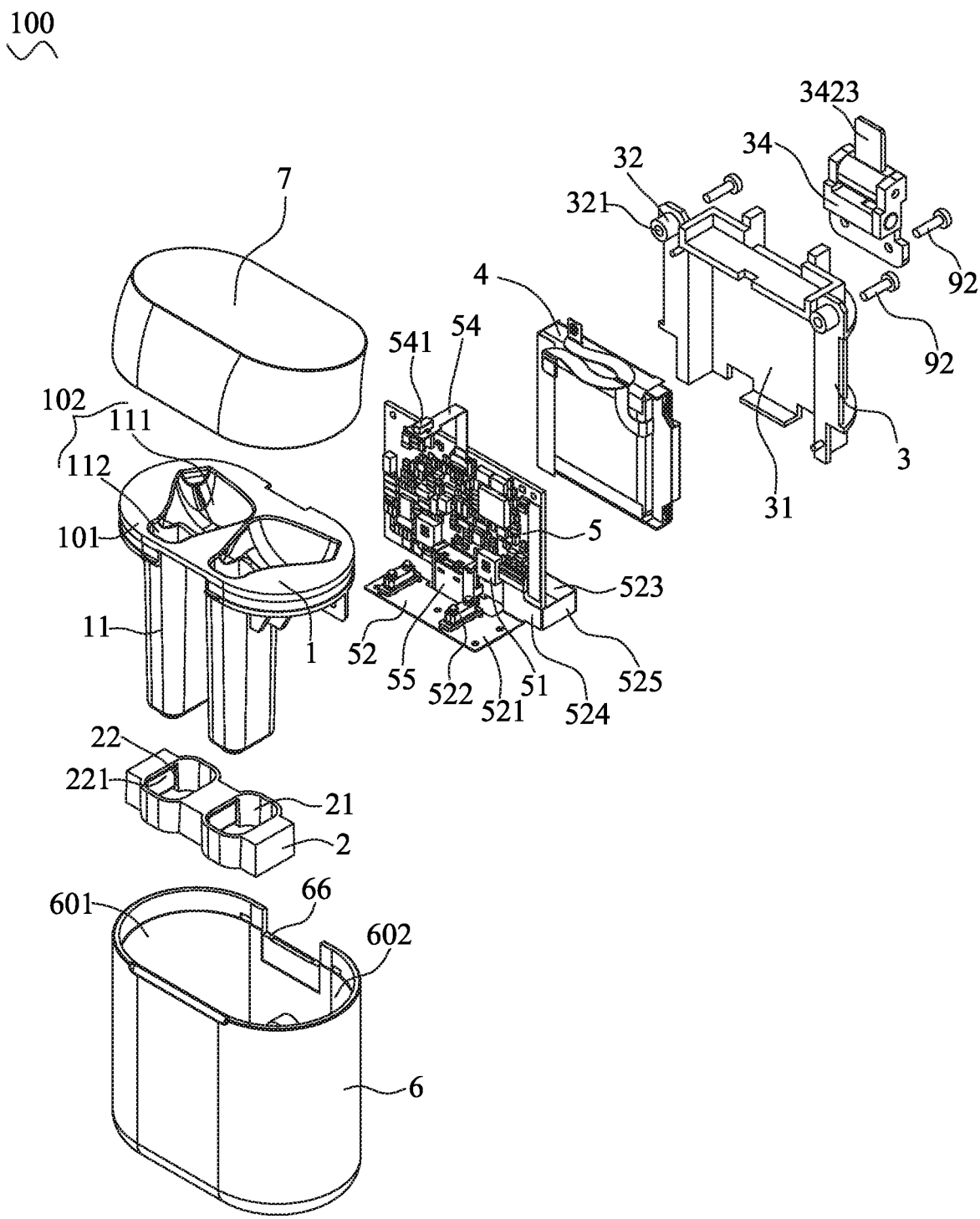
FIG. 3 is an exploded perspective view of the earbud charging storage case in accordance with the present invention.
Figure 4:
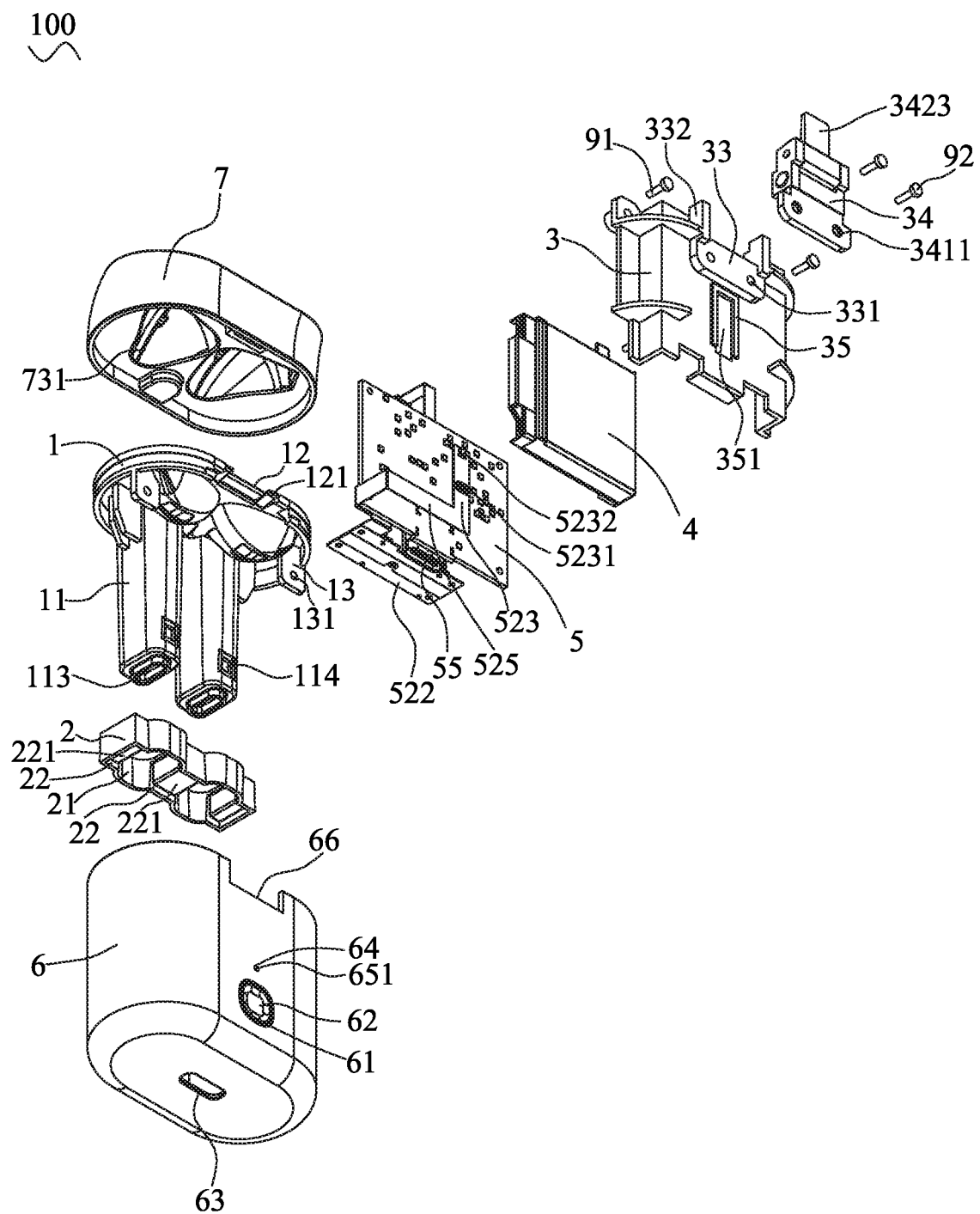
FIG. 4 is another exploded perspective view of the earbud charging storage case of FIG. 3.
Figure 5:
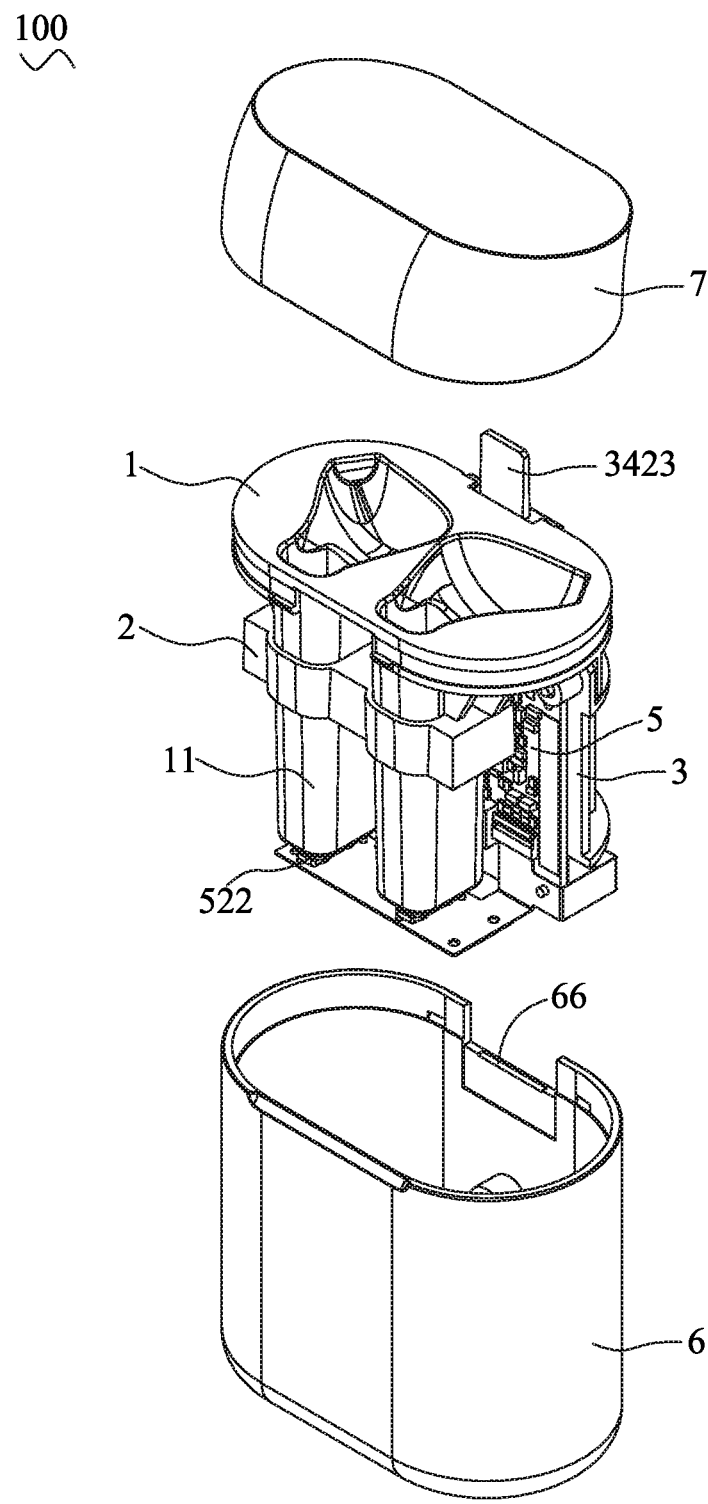
FIG. 5 is a partially exploded perspective view of the earbud charging storage case in accordance with the present invention.
Figure 14:
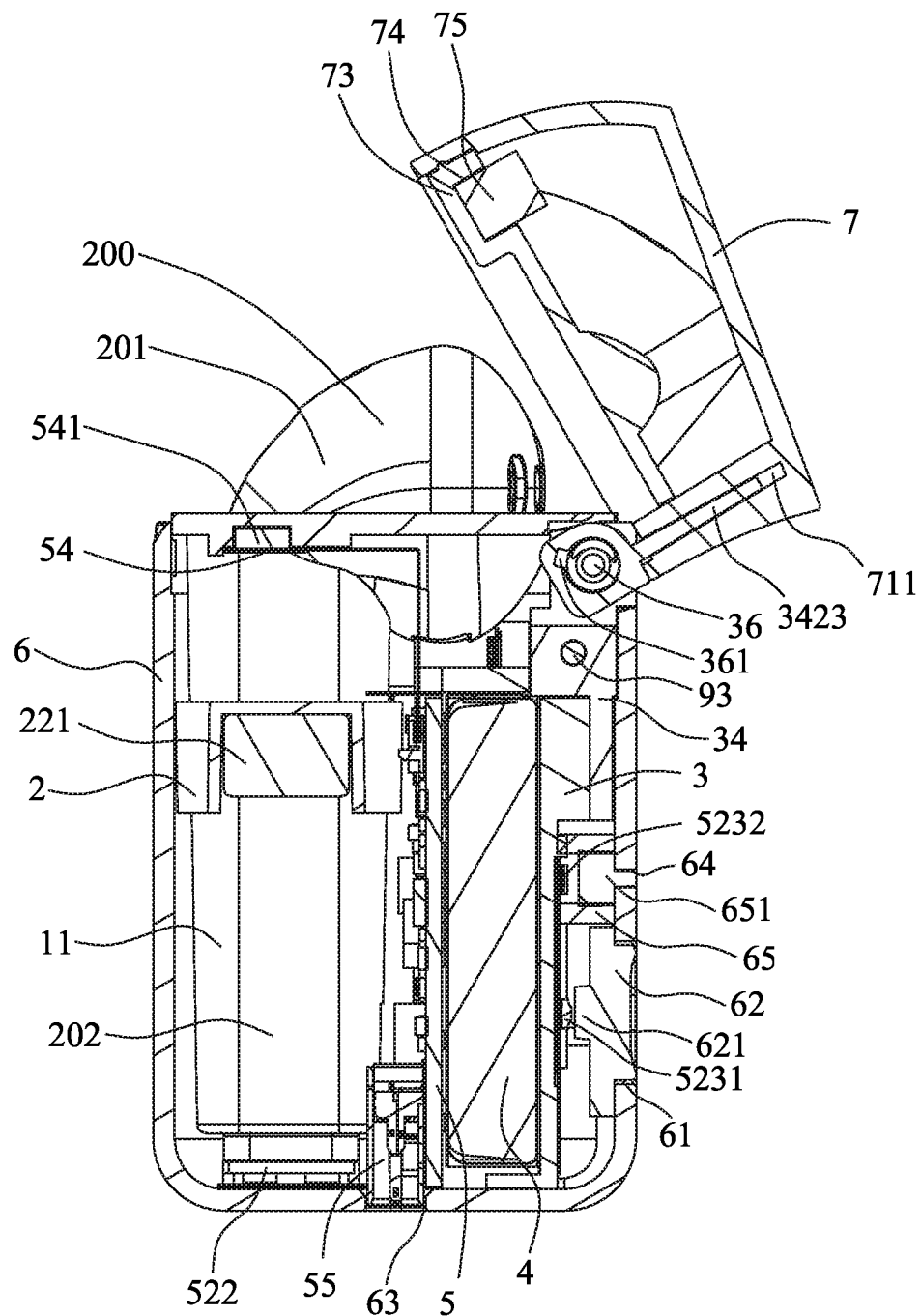
FIG. 14 is a cross-section view of the earbud charging storage case along a line XIV-XIV of FIG. 13.
Figure 15:
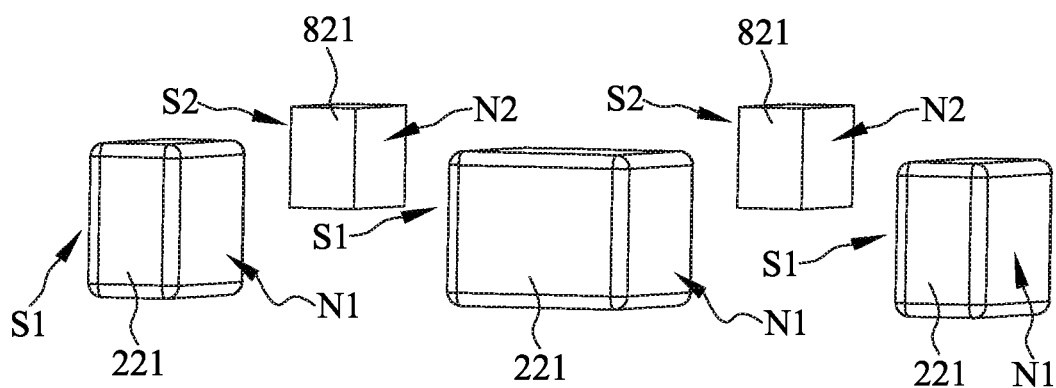
FIG. 15 is a perspective view showing a first magnetic north pole and a first magnetic south pole of each first magnetic component of the earbud charging storage case in accordance with the present invention, and a second magnetic north pole and a second magnetic south pole of the magnetic element of each earbud.

With reference to FIG. 3, FIG. 4 and FIG. 14, the battery 4 is mounted in the locating space 31 of the locating bracket 3.

With reference to FIG. 3, FIG. 4, FIG. 5 and FIG. 14, the rigid printed circuit board 5 is mounted on the front of the locating bracket 3, the rigid printed circuit board 5 covers the battery 4 and is connected to the battery 4. The rigid printed circuit board 5 is equipped with two first sensors 51. The two first sensors 51 are corresponding to the two connecting holes 114 of the two accommodating portions 11 of the earbud holder 1. The two first sensors 51 are capable of confirming whether the pair of the earbuds 200 are placed in the earbud charging storage case 100 through the two connecting holes 114. When the pair of the earbuds 200 are placed in the earbud charging storage case 100, the two first sensors 51 sense an existence of the pair of the earbuds 200 so as to start a charging function of the earbud charging storage case 100.

The rigid printed circuit board 5 is equipped with a first flexible printed circuit (FPC) board 52 and a second flexible printed circuit (FPC) board 54. The first flexible printed circuit board 52 is disposed horizontally and below the accommodating portion 11. The first flexible printed circuit board 52 is equipped with at least one first charging connector 522. A bottom wall of the accommodating groove 112 opens at least one charging hole 113 corresponding to the at least one first charging connector 522. The first flexible printed circuit board 52 includes a first extending portion 521 and a second extending portion 523. The first extending portion 521 is disposed horizontally and is shown as a lying L shape. A mouth of the lying L-shaped first extending portion 521 faces rearward and sideward. The first extending portion 521 of the rigid printed circuit board 5 is equipped with two first charging connectors 522. The two first charging connectors 522 are corresponding to the two charging holes 113 of the two accommodating portions 11 of the earbud holder 1, respectively. When the rigid printed circuit board 5 is assembled to the earbud holder 1, the two first charging connectors 522 pass upward through the two charging holes 113 of the two accommodating portions 11 and are exposed in the two accommodating grooves 112, respectively. A rear end of the first extending portion 521 extends upward to form a first connecting portion 524. A middle of one outer side of the first connecting portion 524 away from the mouth of the first extending portion 521 extends outward, then extends rearward and further extends sideward to form a second connecting portion 525 surrounding one side of the rigid printed circuit board 5.

A rear end of the first flexible printed circuit board 52 extends rearward and then extends to the limiting groove 351 to form the second extending portion 523. A tail end of the second connecting portion 525 extends upward to form the second extending portion 523. The second extending portion 523 is limited in the limiting groove 351. The first flexible printed circuit board 52 extends rearward and then extends to the limiting groove 351, and is limited in the limiting groove 351. The second extending portion 523 is equipped with a switch 5231 and a LED (Light-Emitting Diode) power supply 5232. The second flexible printed circuit (FPC) board 54 is of an inverted L shape. A mouth of the second flexible printed circuit (FPC) board 54 faces frontward and downward. The second flexible printed circuit (FPC) board 54 is equipped with a second sensor 541. A lower portion of the rigid printed circuit board 5 is equipped with a second charging connector 55. The second charging connector 55 is capable of being connected with an external charging cable (not shown) to transmit external power to the battery 4, and the external power is stored in the battery 4, so that the earbud charging storage case 100 is capable of performing a function of charging each earbud 200.

With reference to FIG. 1, FIG. 2, FIG. 3, FIG. 4, FIG. 5, FIG. 6, FIG. 11, FIG. 12 and FIG. 14, the outer shell 6 is of a hollow shape, and a top of the outer shell 6 opens freely. The outer shell 6 has at least one plane side wall 602. A holding space 603 is defined between the at least one accommodating portion 11 and the side wall 602 for receiving the rigid printed circuit board 5, the battery 4 and the locating bracket 3. The locating bracket 3 is positioned between the earbud holder 1 and the plane side wall 602. The battery 4 is positioned between the locating bracket 3 and the earbud holder 1. The rigid printed circuit board 5 is received in the outer shell 6. The rigid printed circuit board 5 is positioned between the earbud holder 1 and the locating bracket 3. The battery 4 is positioned between the rigid printed circuit board 5 and the locating bracket 3. An inside of the outer shell 6 defines a first receiving space 601 penetrating through a middle of the top of the outer shell 6. The outer shell 6 is assembled upward to the earbud holder 1, the magnetic component bracket 2, the locating bracket 3, the battery 4 and the rigid printed circuit board 5, so the outer shell 6 surrounds the earbud holder 1, the magnetic component bracket 2, the locating bracket 3, the battery 4 and the rigid printed circuit board 5. The earbud holder 1 is received in the outer shell 6 for accommodating the at least one earbud 200. A rear of the outer shell 6 opens a first opening 61 corresponding to the switch 5231 of the first flexible printed circuit board 52. The earbud charging storage case 100 further includes a button 62 and a gasket 65. The outer shell 6 is equipped with the gasket 65. The button 62 is corresponding to the first opening 61 and exposed outside from the first opening 61. A front surface of the button 62 projects into the outer shell 6 protrudes frontward to form an abutting block 621. The abutting block 621 is corresponding to the switch 5231.

When a user needs to match each earbud 200 in the earbud charging storage case 100 with a device (not shown) of the user, the user long presses the button 62 to push the abutting block 621 to contact with the switch 5231 to start a Bluetooth function equipped in the rigid printed circuit board 5, so that each earbud 200 is paired with the device of the user by virtue of a Bluetooth function of each earbud 200 through the Bluetooth function of the earbud charging storage case 100. A bottom of the outer shell 6 opens a second opening 63 corresponding to the second charging connector 55. The second charging connector 55 is exposed downward from the second opening 63. The rear of the outer shell 6 opens a third opening 64 corresponding to the LED power supply 5232. The gasket 65 is mounted in the outer shell 6 and corresponding to the third opening 64. The gasket 65 is equipped with a LED (Light-Emitting Diode) light source 651. The LED light source 651 is exposed outside from the third opening 64 and contacts with the LED power supply 5232. When the earbud charging storage case 100 is started, the LED power supply 5232 transmits electrical energies to the LED light source 651 and makes the LED light source 651 shine, so that the user is allowed to know that the earbud charging storage case 100 is in a starting status. A top of the rear of the outer shell 6 opens a fourth opening 66 penetrating through a top surface of the outer shell 6, a rear surface of the fastening unit 34 is exposed to the fourth opening 66.

With reference to FIG. 1 to FIG. 14, the upper cover 7 is of a hollow shape. An inside of the upper cover 7 defines a second receiving space 701 penetrating through a middle of a bottom of the upper cover 7. The bottom of the upper cover 7 opens freely. The upper cover 7 is mounted on the outer shell 6. An inner surface of a rear of the upper cover 7 protrudes inward to form a buckling block 71. A middle of the buckling block 71 opens an insertion slot 711 penetrating through a middle of a bottom surface of the buckling block 71. The insertion slot 711 is corresponding to the fastening portion 3423. When the earbud charging storage case 100 is assembled, the fastening portion 3423 is inserted into the insertion slot 711. Two sides of the inner surface of the rear of the upper cover 7 are recessed rearward to form two clamping slots 72. The buckling block 71 is located between the two clamping slots 72. The earbud charging storage case 100 further includes an inner cover 73 mounted in the upper cover 7, and a second magnetic component 75. Two sides of the inner cover 73 are arched upward to form two arching portions 732. The two arching portions 732 define two upper receiving grooves 731 corresponding to the two lower receiving grooves 111, respectively. Two sides of a front of the inner cover 73 protrude upward and then protrude outward to form two holding blocks 733. Free ends of the two holding blocks 733 are corresponding to and clamped in the two clamping slots 72, respectively. A top surface of the inner cover 73 opens a locating groove 74. The second magnetic component 75 is located in the locating groove 74. The locating groove 74 and the second magnetic component 75 are disposed corresponding to the second sensor 541.

When the upper cover 7 is gradually removed upward and rearward to be partially separated from the outer shell 6, the second magnetic component 75 is gradually separated from the second sensor 541, the second sensor 541 senses a magnetic force change of the second magnetic component 75, and the earbud charging storage case 100 is judged to be in an opened status, so that a Bluetooth pairing function is started, on the contrary, when the upper cover 7 is mounted on the outer shell 6, the second sensor 541 of the rigid printed circuit board 5 senses the magnetic force of the second magnetic component 75, and the earbud charging storage case 100 is judged to be in a closed status, so that functions of the earbud charging storage case 100 is stopped to save a power consumption. The top surface of the inner cover 73 is equipped with two third magnetic components 76 corresponding to the two magnetic parts 14 to make the earbud charging storage case 100 be in the closed status. The upper cover 7 is mounted on the outer shell 6 tightly on account of the third magnetic component 76 and the magnetic part 14 are attracted each other by mutual magnetic attraction forces between the third magnetic component 76 and the magnetic part 14.

With reference to FIG. 12 to FIG. 15, a second magnetic north pole N2 and a second magnetic south pole S2 of the magnetic element 821 are transversely arranged. The second magnetic north pole N2 and the second magnetic south pole S2 of the first magnetic element 821 are opposite to each other along the front-to-rear direction or the right-to-left direction. A bottom of the hand shank 82 is equipped with an earbud charging connector 83.

With reference to FIG. 12 to FIG. 15, when each earbud 200 needs to be charged, at first, the upper cover 7 is raised, at the moment, because the fastening portion 3423 of the second fastening block 342 is fastened in the insertion slot 711 of the upper cover 7, the upper cover 7 is raised away from the top of the outer shell 6 by virtue of the rotation shaft 36 of the fastening unit 34 pivoting rearward, and the two lower receiving grooves 111 and the two accommodating grooves 112 of the earbud charging storage case 100 are exposed outside, so that each earbud 200 is able to be placed in the earbud charging storage case 100. At the moment, the main parts 81 of the pair of the earbuds 200 are placed in the two lower receiving grooves 111, respectively. The hand shanks 82 of the pair of the earbuds 200 are placed in the two accommodating grooves 112, respectively. The earbud charging connectors 83 of the pair of the earbuds 200 are in contact with the two first charging connectors 522 of the earbud charging storage case 100 to transmit electrical energies of the battery 4 to the two earbud charging connectors 83 of the pair of the earbuds 200 via the two first charging connectors 522 for charging the pair of the earbud 200.

At the moment, the at least one magnetic element 821 of the at least one earbud 200 is positioned between the at least two first magnetic components 221. A height difference between a top surface of the at least one first magnetic component 221 and a top surface of the at least one magnetic element 821 is generated, so a downward magnetic attraction force is generated between the at least one magnetic element 821 of the at least one earbud 200 and the at least one first magnetic component 221. When each earbud 200 stores in the earbud charging storage case 100, the magnetic element 821 of each earbud 200 is located between two of the first magnetic components 221 of the magnetic component bracket 2. Top surfaces of the first magnetic components 221 of the magnetic component bracket 2 are lower than top surfaces of the two magnetic elements 821 of the pair of the earbuds 200, so a height difference between the top surfaces of the first magnetic components 221 and the top surfaces of the two magnetic elements 821 is generated. The height difference between the top surfaces of the first magnetic components 221 and the top surfaces of the two magnetic elements 821 improves a mutual attraction characteristic of the first magnetic north poles N1 and the first magnetic south poles S1 of the first magnetic components 221, and the second magnetic north poles N2 and the second magnetic south poles S2 of the two magnetic elements 821 of the pair of the earbuds 200, so a downward magnetic attraction force is generated among two magnetic elements 821 of the pair of the earbuds 200 and the first magnetic components 221. The downward magnetic attraction force generated by each of the first magnetic components 221 is exerted on the corresponding one of the two magnetic elements 821 by virtue of an up-down misaligned disposition way of each of the first magnetic components 221 and the corresponding one of the two magnetic elements 821, so that the two earbud charging connectors 83 of the pair of the earbuds 200 can resist against resilience forces generated by the two first charging connectors 522 of the earbud charging storage case 100 to fully contact with the two first charging connectors 522 of the earbud charging storage case 100 to achieve a charging effect.

As described above, the downward magnetic attraction force generated by each of the first magnetic components 221 is exerted on the corresponding one of the two magnetic elements 821 by virtue of the up-down misaligned disposition way of each of the first magnetic components 221 and the corresponding one of the two magnetic elements 821, so that the two earbud charging connectors 83 of the pair of the earbuds 200 accommodated in the earbud charging storage case 100 can resist against resilience forces generated by the two first charging connectors 522 of the earbud charging storage case 100 to fully contact with the two first charging connectors 522 of the earbud charging storage case 100 to achieve the charging effect.

What is claimed is:

1. An earbud charging storage case for storing and charging a pair of earbuds, each earbud having a magnetic element, the earbud charging storage case comprising:
an earbud holder having a base portion, two sides of a bottom surface of the base portion protruding downward to form two hollow accommodating portions, two sides of a top surface of the base portion being recessed downward to form two lower receiving grooves, respectively, insides of the two accommodating portions having two accommodating grooves penetrating upward through top surfaces of the two accommodating portions, respectively, tops of the two accommodating grooves being connected and communicated with the two lower receiving grooves, respectively, the two lower receiving grooves and the two accommodating grooves together defining two storing grooves, respectively, the pair of the earbuds being accommodated in the two storing grooves, respectively, bottom walls of the two accommodating grooves opening two charging holes for facilitating charging the pair of the earbuds; and a magnetic component bracket looped around the earbud holder, the magnetic component bracket opening two holding grooves corresponding to the two accommodating portions, respectively, the two accommodating portions passing downward through the two holding grooves, several portions of a bottom surface of the magnetic component bracket being recessed upward to form a plurality of buckling grooves, each of the plurality of the buckling grooves being equipped with a first magnetic component, a first magnetic north pole and a first magnetic south pole of the first magnetic component being transversely arranged, when each earbud stores in the earbud charging storage case, the magnetic element of each earbud being located between two of the first magnetic components of the magnetic component bracket, a height difference between top surfaces of the first magnetic components and top surfaces of the two magnetic elements being generated, the height difference between the top surfaces of the first magnetic components and the top surfaces of the two magnetic elements of the pair of the earbuds improving a mutual attraction characteristic of the first magnetic north poles and the first magnetic south poles of the first magnetic components, and the second magnetic north poles and the second magnetic south poles of the two magnetic elements of the pair of the earbuds, so a downward magnetic attraction force being generated among the two magnetic elements of the pair of the earbuds and the first magnetic components.

2. The earbud charging storage case as claimed in claim 1, wherein the top surfaces of the first magnetic components of the magnetic component bracket are lower than the top surfaces of the two magnetic elements of the pair of the earbuds.

3. The earbud charging storage case as claimed in claim 1, wherein the plurality of the buckling grooves are isolated by the two holding grooves and spaced from one another.

4. The earbud charging storage case as claimed in claim 1, further comprising a locating bracket mounted to a rear of the earbud holder, a battery and a rigid printed circuit board, a front of the locating bracket being recessed rearward to form a locating space, a rear surface of the locating bracket protruding rearward to form a blocking frame, an inside of the blocking frame having a limiting groove, the battery being mounted in the locating space, the rigid printed circuit board being mounted on the front of the locating bracket, the rigid printed circuit board covering the battery and being connected to the battery, the rigid printed circuit board being equipped with a first flexible printed circuit board, the first flexible printed circuit board extending rearward and then extending to the limiting groove, and being limited in the limiting groove.

5. The earbud charging storage case as claimed in claim 4, wherein rears of the two accommodating portions open two connecting holes, respectively, the rigid printed circuit board is equipped with two first sensors, the two first sensors are corresponding to the two connecting holes of the two accommodating portions.

6. The earbud charging storage case as claimed in claim 4, wherein the rigid printed circuit board is equipped with a second flexible printed circuit board of an inverted L shape, a mouth of the second flexible printed circuit board faces frontward and downward, the second flexible printed circuit board is equipped with a second sensor, the earbud charging storage case includes an upper cover, an inner cover mounted in the upper cover, and a second magnetic component, a top surface of the inner cover opens a locating groove, the second magnetic component is located in the locating groove, the locating groove and the second magnetic component are disposed corresponding to the second sensor.

7. The earbud charging storage case as claimed in claim 4, wherein the first flexible printed circuit board includes a first extending portion and a second extending portion, the first extending portion is disposed horizontally and is shown as a lying L shape, the first extending portion is equipped with two first charging connectors, the two first charging connectors are corresponding to the two charging holes, the two first charging connectors pass upward through the two charging holes and are exposed in the two accommodating grooves, respectively, a rear end of the first extending portion extends upward to form a first connecting portion, one outer side of the first connecting portion extends outward, then extends rearward and further extends sideward to form a second connecting portion, a tail end of the second connecting portion extends upward to form the second extending portion, the second extending portion is limited in the limiting groove.

8. The earbud charging storage case as claimed in claim 7, further comprising an outer shell, an upper cover mounted on the outer shell, and a button, the second extending portion being equipped with a switch, a lower portion of the rigid printed circuit board being equipped with a second charging connector, the outer shell being assembled upward to the earbud holder, the magnetic component bracket, the locating bracket, the battery and the rigid printed circuit board, so the outer shell surrounding the earbud holder, the magnetic component bracket, the locating bracket, the battery and the rigid printed circuit board, a rear of the outer shell opening a first opening corresponding to the switch, the button being corresponding to the first opening and exposed outside from the first opening, a bottom of the outer shell opening a second opening corresponding to the second charging connector, the second charging connector being exposed downward from the second opening.

9. The earbud charging storage case as claimed in claim 8, wherein the rear surface of the locating bracket protrudes rearward to form a convex board, the convex board opens at least one second fixing hole longitudinally penetrating through the locating bracket, two portions of the convex board protrude outward to form two protruding blocks arranged transversely, the earbud charging storage case further includes a fastening unit disposed between the two protruding blocks, the fastening unit includes a first fastening block, and a second fastening block mounted on a top of the first fastening block, a top of the second fastening block protrudes upward to form a fastening portion, an inner surface of a rear of the upper cover protrudes inward to form a buckling block, the buckling block opens an insertion slot penetrating through a middle of a bottom surface of the buckling block, the insertion slot is corresponding to the fastening portion, the fastening portion is inserted into the insertion slot.

10. The earbud charging storage case as claimed in claim 8, wherein the second extending portion is equipped with a light-emitting diode power supply, a rear of the outer shell opens a third opening corresponding to the light-emitting diode power supply, the outer shell is equipped with a gasket, the gasket is mounted in the outer shell and corresponding to the third opening, the gasket is equipped with a light-emitting diode light source, the light-emitting diode light source is exposed outside from the third opening and contacts with the light-emitting diode power supply.

11. The earbud charging storage case as claimed in claim 1, wherein the two sides of the bottom surface of the base portion are equipped with two magnetic parts adjacent to two opposite sides of the two accommodating portions, respectively, the earbud charging storage case further includes an inner cover, a top surface of the inner cover is equipped with two third magnetic components corresponding to the two magnetic parts.

12. An earbud charging storage case for storing and charging at least one earbud which has at least one magnetic element, comprising:
   an outer shell;
   an earbud holder received in the outer shell, the earbud holder having a base portion, at least one portion of a bottom surface of the base portion protruding downward to form at least one hollow accommodating portion, at least one portion of a top surface of the base portion being recessed downward to form at least one lower receiving groove, an inside of the at least one accommodating portion having at least one accommodating groove penetrating upward through a top surface of the at least one accommodating portion, a top of the at least one accommodating groove being connected and communicated with the at least one lower receiving groove, the at least one lower receiving groove and the at least one accommodating groove together defining at least one storing groove, the at least one earbud being accommodated in the at least one storing groove;
   a magnetic component bracket positioned around the at least one accommodating portion, the magnetic component bracket having at least one first magnetic component magnetically attracting the at least one magnetic element of the at least one earbud, a height difference between a top surface of the at least one first magnetic component and a top surface of the at least one magnetic element being generated, so a downward magnetic attraction force being generated between the at least one magnetic element of the at least one earbud and the at least one first magnetic component;
   wherein the magnetic component bracket has at least two first magnetic components, the at least one magnetic element of the at least one earbud is positioned between the at least two first magnetic components, a first magnetic north pole and a first magnetic south pole of each first magnetic component are transversely arranged, a second magnetic north pole and a second magnetic south pole of the magnetic element are transversely arranged; and
   an upper cover mounted on the outer shell.

13. The earbud charging storage case as claimed in claim 12, wherein the magnetic component bracket has at least one holding groove corresponding to the at least one accommodating portion, the at least one accommodating portion passes downward through the at least one holding groove.

14. The earbud charging storage case as claimed in claim 13, wherein at least two portions of a bottom surface of the magnetic component bracket are recessed upward to form at least two buckling grooves for receiving the at least two first magnetic components respectively.

15. The earbud charging storage case as claimed in claim 13, wherein the outer shell has at least one plane side wall, a holding space is defined between the at least one accommodating portion and the side wall for receiving a rigid printed circuit board, a battery and a locating bracket.

16. An earbud charging storage case for storing and charging at least one earbud, comprising:
   an outer shell having at least one plane side wall;
   an earbud holder received in the outer shell for accommodating the at least one earbud;
   a locating bracket positioned between the earbud holder and the plane side wall;
   a battery positioned between the locating bracket and the earbud holder;
   a rigid printed circuit board received in the outer shell; and
   an upper cover mounted on the outer shell.

17. The earbud charging storage case as claimed in claim 16, wherein the rigid printed circuit board is positioned between the earbud holder and the locating bracket, the battery is positioned between the rigid printed circuit board and the locating bracket.

18. The earbud charging storage case as claimed in claim 17, wherein a front of the locating bracket is recessed rearward to form a locating space, the battery is mounted in the locating space.

19. The earbud charging storage case as claimed in claim 18, wherein the rigid printed circuit board is equipped with a first flexible printed circuit board, the first flexible printed circuit board is disposed horizontally and below the accommodating portion, the first flexible board is equipped with at least one first charging connector, a bottom wall of the accommodating groove opens at least one charging hole corresponding to the at least one first charging connector.

* * * * *